(12) United States Patent
Kaminski et al.

(10) Patent No.: US 10,199,129 B1
(45) Date of Patent: Feb. 5, 2019

(54) METHOD FOR RADIONUCLIDE CONTAMINATECONTAMINANT MITIGATION

(71) Applicant: Energy, United States Department of, Washington, DC (US)

(72) Inventors: Michael D Kaminski, Lockport, IL (US); Carol J Mertz, Downers Grove, IL (US)

(73) Assignee: U.S. Department of Energy, Washington, DC (US)

( * ) Notice: Subject to any disclaimer, the term of this patent is extended or adjusted under 35 U.S.C. 154(b) by 252 days.

(21) Appl. No.: 15/233,680

(22) Filed: Aug. 10, 2016

(51) Int. Cl.
*B01D 11/02* (2006.01)
*B01J 39/02* (2006.01)
(Continued)

(52) U.S. Cl.
CPC .......... *G21F 9/002* (2013.01); *B01D 11/0288* (2013.01); *B01J 39/02* (2013.01);
(Continued)

(58) Field of Classification Search
CPC . G21F 9/002; G21F 9/162; G21F 9/00; G21F 9/001; G21F 9/004; G21F 9/16; G21F 9/301; G21F 9/302; B01J 39/14; B01J 39/02; B01J 20/04; B01J 20/12; B01J 2220/42; G21Y 2004/10; G21Y 2002/501; G21Y 2002/60; B08B 3/04; B08B 3/08; B08B 3/10; B08B 7/00; B08B 7/04; B01D 11/02; B01D 11/028; B01D 11/0288; B01D 15/00
(Continued)

(56) References Cited

U.S. PATENT DOCUMENTS 4,882,094 A * 11/1989 Rubin ................ G21F 9/34
210/295
5,434,331 A * 7/1995 Barkatt ................ C23G 1/02
134/10
(Continued)

OTHER PUBLICATIONS

P. Atcha Rao et al, "Experimental Investigation on Pool Boiling Heat Transfer With Ammonium Dodecyl Sulfate", Journal of Engineering Research and Applications, vol. 5, Issue 11, Nov. 2105, pp. 98-102.*
(Continued)

*Primary Examiner* — Joseph W Drodge
(74) *Attorney, Agent, or Firm* — Jacob A. Heafner; Michael J. Dobbs; Brian J. Lally (57) ABSTRACT

The method and system disclosed provides radionuclide contamination mitigation by applying an aqueous carrier solution comprising a cation to a surface bearing a radionuclide contaminant to cause the radionuclide contaminant to enter solution forming a laden solution, then contacting the laden solution with a sequestering agent to bind to the radionuclide contaminant to form a laden sequestering agent. The removal and sequestration of the radionuclide contaminant from the contaminated surface leads directly to a reduction in the amount of radiologically-impacted critical infrastructure and the environment. The method and system are able to be performed or utilized economically with materials quickly available in the event of a radiological dispersion event.

14 Claims, 7 Drawing Sheets

(51) Int. Cl.
    *B01J 39/14*    (2006.01)
    *G21F 9/16*    (2006.01)
    *G21F 9/00*    (2006.01)
(52) U.S. Cl.
    CPC .............. *B01J 39/14* (2013.01); *G21F 9/162* (2013.01); *G21Y 2002/501* (2013.01); *G21Y 2002/60* (2013.01); *G21Y 2004/10* (2013.01)
(58) Field of Classification Search
    USPC ......... 210/682, 684, 688; 134/26, 42; 588/1, 588/2, 18, 300, 315, 249.5, 252, 261
    See application file for complete search history.

(56) References Cited

U.S. PATENT DOCUMENTS

| | | | | |
|---|---|---|---|---|
| 5,613,238 A | * | 3/1997 | Mouk | ................. B09C 1/02 134/10 |
| 5,961,736 A | * | 10/1999 | Borah | ................. C02F 5/083 134/26 |
| 2013/0037048 A1 | * | 2/2013 | Edgington | ............... A62D 5/00 134/4 |
| 2013/0231270 A1 | * | 9/2013 | Kaminski | ............. C11D 1/008 510/110 |
| 2014/0263073 A1 | * | 9/2014 | Barker | ................ C02F 1/42 210/668 |
| 2015/0129504 A1 | * | 5/2015 | Kaplan | ................. C02F 1/281 210/682 |

OTHER PUBLICATIONS

Samuleev et al, "Decontamination of radionuclides on construction materials", J. Radioanal. Nucl. Chem, 2013, vol. 296, pp. 811-815.*
Faghihian et al, "Removal of Radioactive Iodide by Surfactant-modified Zeolites", Adsorption Science & Technology, vol. 21, No. 4, 2003, pp. 373-381.*
Kumar et al, "Chemical, biological, radiological and nuclear decontamination: Recent trends and future perspective", J. Pharm. Bioallied Sci., Jul.-Sep. 2010, Issue, pp. 220-238.*

* cited by examiner

METHOD FOR RADIONUCLIDE CONTAMINATECONTAMINANT MITIGATION

GOVERNMENT INTERESTS

The United States Government has rights in this invention pursuant to Contract No. DE-AC02-06CH11357 between the U.S. Department of Energy and the University of Chicago representing Argonne National Laboratory, and funding from the U.S. Environmental Protection Agency.

FIELD OF INVENTION

One or more embodiments of the present invention relates to methods and systems for the mitigation of radionuclide contaminants from contaminated surfaces. The method is particularly useful for mitigation with the intended purpose of quickly restoring critical infrastructure and operational activities following a radionuclide dispersion event.

BACKGROUND

During a radionuclide dispersion event, a radionuclide dispersion event being a release of radioactive contaminants through an act of malice, nuclear reactor accident, or otherwise, large swaths of area and equipment may be contaminated. An exemplary act of malice is the activation of a radiological dispersal devise, commonly known as a "dirty bomb," where an amount of radioactive material is used to maliciously contaminate people, equipment, and/or the environment without a nuclear explosion. "'Dirty Bombs': Technical Background, Attack Prevention and Response, Issues for Congress" J. Medalia, 7-5700, Jun. 24, 2011, Congressional Research Service."

In the course of such a radiological dispersion event, radionuclide contaminants may be spread across large areas. Surfaces of critical infrastructure and equipment such as fire houses, medical facilities, and emergency response tools and equipment onto which the radionuclide contaminants rest may become contaminated, in turn compromising response efforts by emergency response officials. In addition, some public services such as drinking and wastewater treatment, electrical power distribution, etc. may be disrupted. In such an event, it is important to deploy mitigation efforts to reduce levels of radioactive contaminants by removal or decontaminating certain areas in order to restore response activities and public services. Disclosed herein is a method and system useful for the mitigation of radionuclide contamination from surfaces bearing radionuclide contaminants. The method and system are particularly useful to rapidly return components such as fire-fighting equipment to service following a radionuclide dispersion event while also avoiding further radionuclide contaminant spread beyond the original deposition area and minimizing the amount of additional materials contaminated during the mitigation processes. The method and system are rapidly deployable, cost-effective measures to mitigate critical infrastructure and equipment for the purpose of restoring that infrastructure and equipment to operational activities after a radiological release.

Application of the radionuclide contaminant mitigation method or utilization of the system has the potential to reduce the level of radionuclide contaminants on surfaces. They may be performed on both a small scale as on tools, detectors, and personal protective equipment, as well as on a large scale as would be the case with critical infrastructure or equipment. Thus, by performing the method or utilizing the system, the exposure to radiation by emergency workers, responders, and the general population who are in close proximity to those surfaces is lessened. The method comprises applying a carrier solution comprising a cation onto a surface bearing a radionuclide contaminant, such that the radionuclide contaminant enters the solution to form a laden solution. The method then employs contacting the radionuclide contaminant laden solution with solid sequestering agents that bind to and immobilize at least a portion of the radionuclide contaminant. In providing another binding material, the mobility of the radionuclide contaminant through the environment is lessened as a whole.

Mitigation with respect to the method refers to the removal of at least a portion of the radionuclide contaminant from a bearing surface. Mitigation typically occurs shortly after a radiological dispersion event. This removal is necessary in order to restore critical infrastructure such as fire houses to a level that the infrastructure can be utilized. Note that mitigation differs from decontamination; a long term activity designed to clean-up the contaminated infrastructure to acceptable near background levels. Thus, these mitigation methodologies may not be as effective in decreasing radionuclide contaminant radiation levels to background level as those methodologies used for final decontamination. Nevertheless, during mitigation, speed and economy at which methodologies or systems can be deployed and completed may be of equal importance relative to effectiveness, and may also impact the effectiveness of follow-on decontamination for longer term recovery.

Radionuclide contaminants include the isotopes of stable elements that produce alpha, beta, or gamma radiation through their radioactive decay. Radioisotopes are rarely available in quantities sufficient to cause harm outside of highly restricted areas such as nuclear reactors. Thus, while there are approximately 3,715 different identified radionuclides, there is a relatively small number likely to be spread in a radiological dispersion event based on quantities available, key physical and chemical characteristics such as half-life, and decay activity. Those radioisotopes of greatest concern are listed in Table A below. Of those listed in Table A, the radioisotopes available most likely to be in civilian control and thus most likely to be spread by a radiological dispersion event include Co-60, Cs-137, Ir-192, Sr-90 and Am-241.

TABLE A

| Radioisotope | Mode of Decay |
| --- | --- |
| Am-241 | α |
| Cd-109 | x-ray |
| Cf-252 | α |
| Co-60 | β-γ |
| Cs-137 | β-γ |
| Cs-134 | β-γ |
| Fe-55 | x-ray |
| Gd-153 | x-ray |
| Ho-166 | β-γ |
| I-125 | x-ray-γ |
| I-131 | β-γ |
| Ir-192 | β-γ |
| Kr-85 | β-γ |
| Lu-177 | β-γ |
| Ni-63 | β |
| P-32 | β |
| P-33 | β |
| Pd-109 | β-γ |
| S-35 | β |

TABLE A-continued

| Radioisotope | Mode of Decay |
| --- | --- |
| Se-75 | γ |
| Sr-90 | β |
| W-188 | β |

Radionuclide contaminants may be in a variety of physical forms such as powders, clad with ceramics (reactor fuel rods), etc. The most likely forms are cesium chloride, cesium oxides, cesium alumino-silicates, other cesium ceramic materials, strontium fluoride, strontium oxides, strontium titanates, cobalt metal or metal alloy, iridium metal or metal alloy, and mixed fission product and actinide nitrates. Of these, the alumino-silicates, ceramics, titanates, metals and metal alloys are insoluble in water and would likely persist as particulate material after dispersion into the environment. As such, decontamination would involve the physical removal of particles from contaminated surfaces rather than chemical desorption of radioactive contaminants from surface chemical sorption sites.

The cesium chloride and oxides, and the strontium fluorides and oxides are soluble in aqueous solutions. After dispersion during a radionuclide dispersion event, these radionuclide contaminants can dissolve in the water present within a building material (e.g., pore water), from a precipitation event, or from contact with bulk water (e.g., fire hose, ocean spray). This dissolution of the radionuclide contaminants allows them to easily become chemically bonded onto the surface material, primarily through ion exchange reactions with the surface. In terms of chemical form, those radionuclides that persist as small particulate are easier to mitigate than those that have dissolved in water and reacted chemically with the surface.

Figure 1:
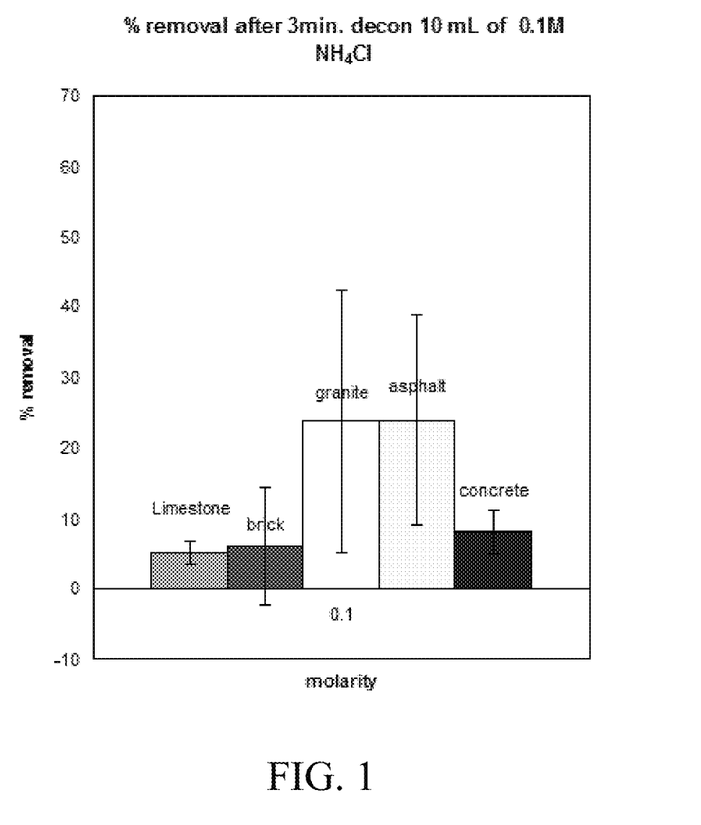
FIG. 1 illustrates performance across multiple surface types.

As illustrated in FIG. 1, the chemical and physical characteristics of the surface on which the radionuclide contaminant rests has a significant impact on the percentage of radionuclide contaminant that can be mobilized by the carrier solution. Asphalt, brick, limestone, granite, and concrete are representative of porous urban construction materials present in critical infrastructure such as roadways, hospitals, and public works facilities. Different surfaces frequently lead to different sorption mechanisms and dissimilar surfaces promote mobilization of the radionuclide contaminants while using the method or system.

The mitigation of radionuclide contamination as performed by the method and system, when put into the context of the overall response to a radiological dispersion event, makes a significant difference in the outcome in several areas. The resulting reduction allows emergency responders to conduct operations for longer periods of time by reducing their cumulative dose of radiation while working in a "hot" zone. This is critical in the early phases of a radiological dispersion event when the number of first responders will be limited. In an exemplary radiological dispersion event where there would be a release of 1,000 Curies of Cesium-137 (50 grams) over an urban area of 2.10 km$^2$, a population of 38,000 individuals if not removed from the area would experience an increase of 233 cases of cancer including 159 fatal cases, from a first year of exposure alone. "'Dirty Bombs': Technical Background, Attack Prevention and Response, Issues for Congress" J. Medalia, 7-5700, Jun. 24, 2011, Congressional Research Service."

During emergency response operations, a 50% reduction of a radionuclide contaminant such as Cs-137 from the surface of a piece of equipment and the resulting reduction in radiation exposure will allow emergency response workers to remain in the area twice as long performing twice as much life-saving activity at a time when qualified workers represent a scarce resource. The lower exposure also benefits workers involved in restoring the area to its original condition during late-phase recovery activities by removing the easily mobilized radionuclide contaminants from the area before more aggressive decontamination procedures are implemented. Further, reducing the contamination level even 30% at the beginning of a radiological dispersion event response may result in significant savings later, because the longer the radionuclide contaminant remains in contact with some common materials, the more aggressive the approach needed to decontaminate them—for example grinding off the surface may be necessary, which can be logistically more challenging and destructive and further results in a higher cumulative radiation dose exposure to the work force. Finally, reduction in radionuclide contaminants via this method correlate to potentially significant reductions in the volumes of radiologically impacted wastewater. Namely, the method immobilizes and allows the removal of radionuclide contaminants preventing their spread through a watershed.

SUMMARY

The method disclosed provides radionuclide contamination mitigation by applying an aqueous carrier solution comprising a cation to a surface bearing a radionuclide contaminant, causing the radionuclide contaminant to enter solution to form a laden solution, then contacting the laden solution with a solid sequestering agent to bind to the radionuclide contaminant to form a laden sequestering agent. The removal and sequestration of the radionuclide contaminant from the contaminated surface leads directly to a reduction in the amount of radiologically-impacted equipment, critical infrastructure, and the environment. The method is able to be performed economically with materials quickly available in the event of a radiological dispersion event.

In a second embodiment, the method described provides radionuclide contamination mitigation by forming a brine; mixing a carrier solution comprising the brine and water; applying the carrier solution to a surface bearing a radionuclide contaminant causing a laden solution to be formed, and contacting the laden solution with a sequestering agent causing the formation of a laden slurry comprising laden sequestering agent and reformed carrier solution.

In another embodiment, a system provides for the mitigation of a surface bearing a radionuclide contaminant. The system provides an applicator for applying a carrier solution to a surface bearing a radionuclide contaminant and a container for a sequestering agent;

DETAILED DESCRIPTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a method and system for the mitigation of radionuclide contamination of a surface.

Embodiments of the invention are directed to a method and system for mitigation of a radionuclide contaminant from a surface. The method for mitigation generally comprises applying a carrier solution comprising a cation and water, to a surface bearing a radionuclide contaminant, resulting in mobilization of the radionuclide contaminant into the carrier solution to form a laden solution, and contacting the laden solution with a solid sequestering agent such that the radionuclide contaminant in the laden solution binds to the sequestering agent to form a laden sequestering agent and generating a laden slurry comprising the laden sequestering agent and reformed carrier solution.

Further embodiments include forming a brine solution comprising the cation and water. Still further embodiments include retaining the sequestering agent in a permeable container. Another embodiment includes performing a separating operation on the laden slurry to separate the laden sequestering agent from the reformed carrier solution. Still further embodiments include recycling the carrier solution to again apply it to a radionuclide contaminant bearing surface.

One embodiment of the invention is a system for the mitigation of a radionuclide contaminant from a surface, the system comprising: an applicator for applying a carrier solution comprising a cation and water, and a container for a sequestering agent.

Surfaces Bearing a Radionuclide Contaminant

Radionuclide Contaminant:

As noted above, radionuclide contaminants are spread across a surface during a radionuclide dispersion event. Radionuclide contaminants of greater concern are those identified in Table A. The method and system, in particular, are useful for the mitigation of Cs-137 and Sr-90.

Figure 2:
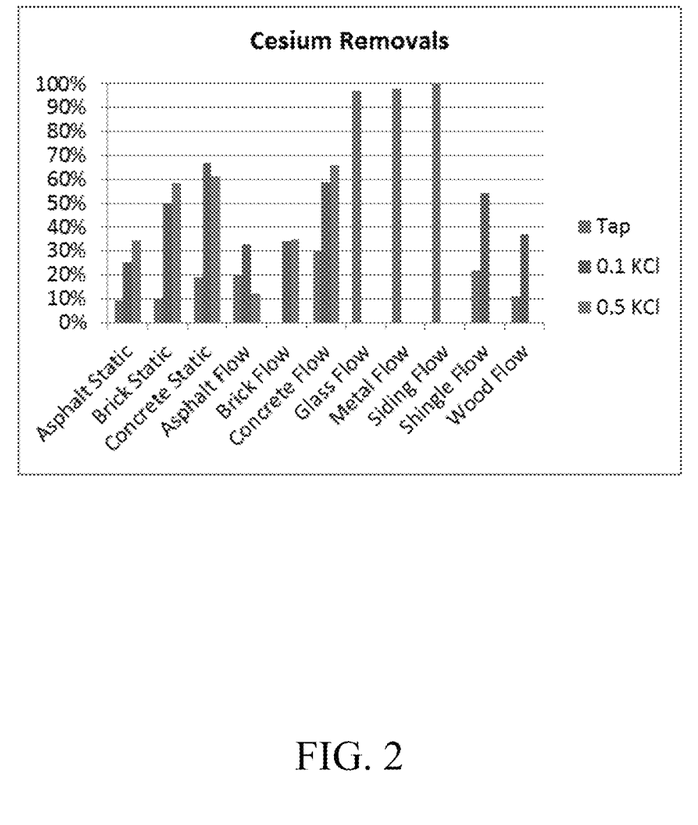
FIG. 2 illustrates the percent of removal of Cs-137 from coupons of varying materials.
Figure 3:
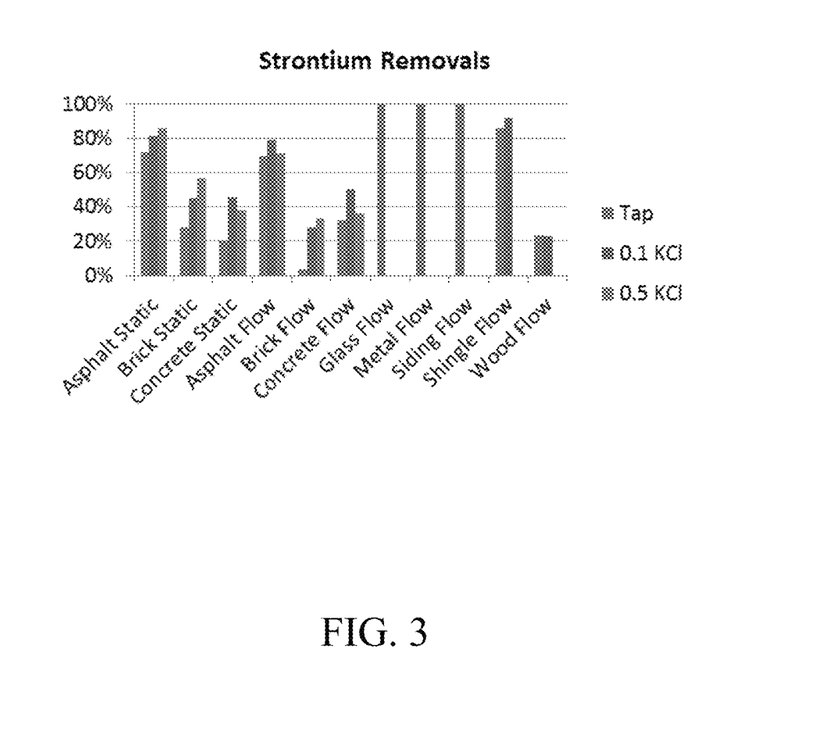
FIG. 3 illustrates the percent of removal of Sr-85 from coupons of varying materials.

Surface:

The surfaces bearing a radionuclide contaminant vary to include non-porous, metallic surfaces such as hand tools, porous surfaces such as concrete. Further, the surfaces may be composed of inorganic or organic materials such as in textiles. The chemical and physical characteristics of the surface on which the radionuclide contaminant rests has a significant impact on the percentage of radionuclide contaminant that can be mobilized by the carrier solution. Depending on the character of the contaminated surface, the amount of radiation reduction via the method or system may be as high as 90-100% for non-porous surfaces. For porous surfaces where the radionuclide contaminant penetrates or binds with high affinity, the amount of radiation reduction may still reach 30-50%. (FIGS. 2 and 3)

Carrier Solution

Solvent:

The carrier solution generally comprises water and a cation. Aqueous solutions are beneficial as they are quickly accessible in large quantities through supplies such as municipal supply water from water hydrants. Where municipal supplies are not available, water may be sourced from stores such as reservoirs, cisterns, and tanks. In addition to their benefits due to availability, the aqueous carrier solution is beneficial as the solvent itself does not further contaminate the wash (mitigation) area.

Cations:

In addition to the aqueous solvent, the carrier solution is further comprised of cations in the aqueous solvent. The cations are thought to promote ion exchange replacement reactions with radionuclide contaminants bound to the contaminated surfaces. Cations are preferentially selected for use in the method and system based on charge density and hydrated radii. Further, such cation characteristics may be used as a basis for selection through relative comparison to the radionuclide contaminants to be mitigated. For example, the cation $K^+$ may be selected for the mitigation of cesium radionuclides, based on the similarity of charge density and ionic radius. Preferably, the ionic radius is within about 20% difference of the cation selected and the radionuclide to be mitigated.

Preferred cations for use in the method and system include potassium ($K^+$), ammonium ($NH_4^+$), and sodium (Na+). Other suitable cations include barium ($Ba^{2+}$), calcium ($Ca^{2+}$), and magnesium ($Mg^{2+}$). Fortunately, these cations are available worldwide in bulk quantities as potassium chloride, potassium nitrate, ammonium nitrate, and ammonium chloride as well as other forms. Further, mixtures of cations are contemplated. For example, carrier solutions may include both $K^+$ and $NH_4^+$ in solution via the soluble salts KCl and $NH_4Cl$.

Figure 4:
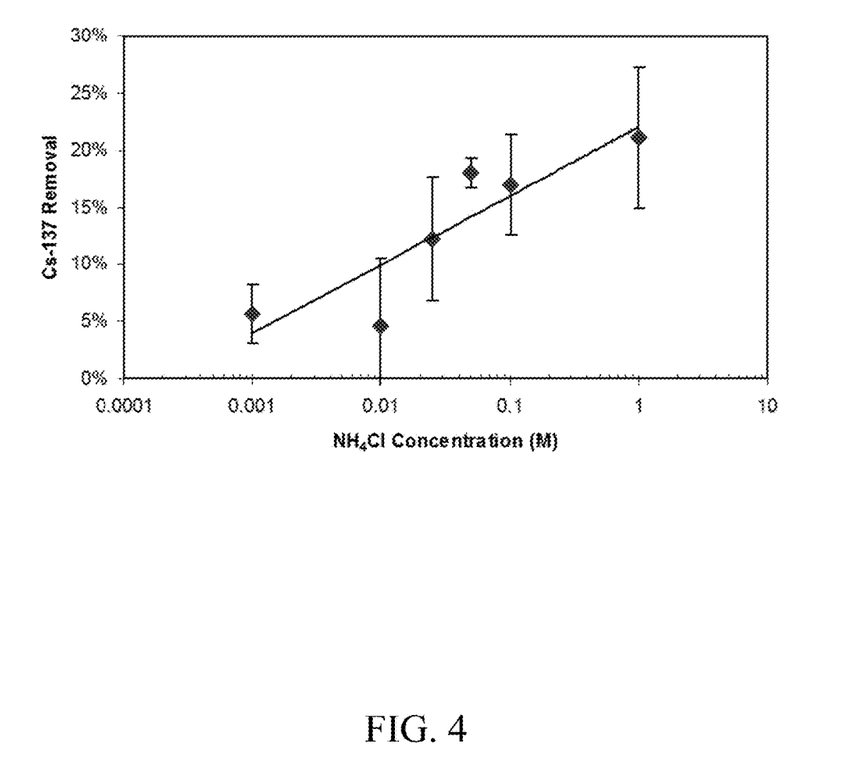
FIG. 4 illustrates Cs-137 (in % removed) from coarse aggregate of concrete derived a function of $NH_4^+$ concentration.

A salient aspect of the invention is the concentration of the cation in the carrier solution. If the concentration is too low, the carrier solution fails to promote the radionuclide contaminant entering solution via the ion-exchange route (FIG. 4). If the concentration is too high, the method and system risk the carrier solution causing premature collapse of the sequestering agents as the cations compete with the radionuclide contaminant. Additionally, excessively high concentrations increase the economic and logistical burden, causing unnecessarily large stockpiling of supplies for increasingly diminishing returns of effectiveness.

As used in the method, the concentration of the cations is preferentially in a range from about 0.1 M to about 1.0 M. More preferentially, the range is from about 0.1 M to about 0.5 M. Most preferentially, the range is from about 0.25 M to about 0.5 M.

Figure 5:
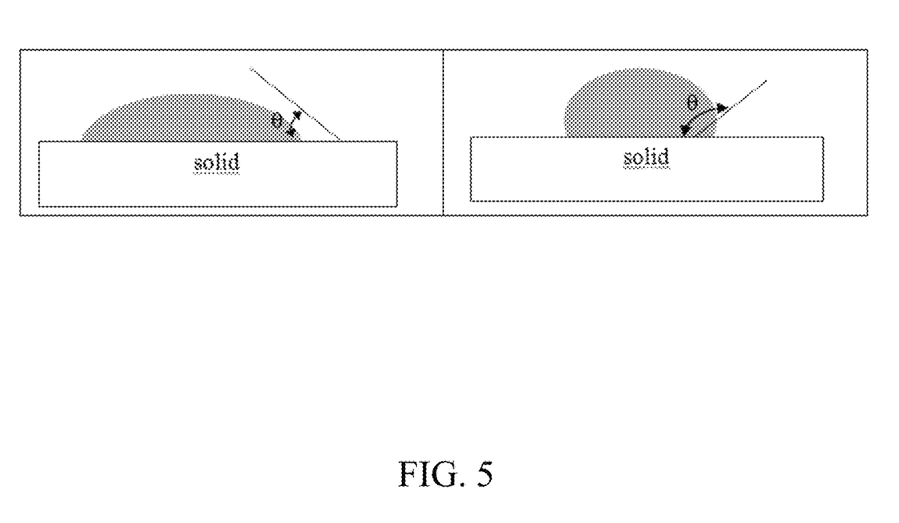
FIG. 5 illustrates the effect of surfactants on the wettability of a surface.
Figure 6:
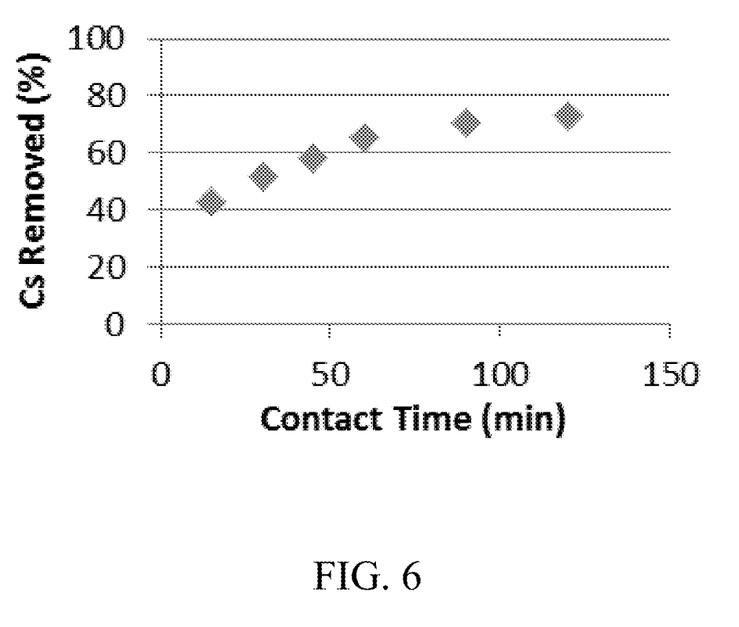
FIG. 6 illustrates the percent increase of Cs-137 removed from a surface as a function of time of exposure using 0.5M $CaCl_2$.

Surfactant:

In one embodiment, the carrier solution further comprises a surfactant to facilitate mobilization of a radionuclide contaminant into the carrier solution. Some surfaces promote greater bonding of the radionuclide contaminant to the surface. For example, radionuclide contaminants are able to form stronger bonds to certain aggregates in concrete. With respect to other surfaces, a hydrophobic character discourages sufficient contact with the aqueous carrier solution to allow the radionuclide contaminant to enter the carrier solution for a laden solution. In these situations, addition of a surfactant to the carrier solution acts to improve the wettability of hydrophobic surfaces such as asphalt to promote ion exchange. A wetting liquid forms a contact angle with the solid that is less than 90°, whereas a nonwetting liquid creates a contact angle between 90° and 180° with the solid (FIG. 5).

Surfactants found suitable as additives in the carrier solution are anionic and neutral surfactants since these are widely available and are compatible with use outdoors. For instance, cationic surfactants can be disruptive to cell membranes. Exemplary anionic surfactants available worldwide and in large quantities to use in the method include sodium stearate, sodium dodecyl sulfate, ammonium dodecyl sulfate, cetyltrimethyl ammonium bromide, sodium dodecylbenzenesulfonate and other linear alkylbenzene sulfonates (LAS). Exemplary non-ionic surfactants include TRITON X-100 [polyethylene glycol p-(1,1,3,3-tatramethylbutyl)-phenyl ether] and other polyoxyethylene glycol octylphenol ethers, polyoxyethylene glycol alkyl ethers and polyoxypropylene glycol alkyl ethers; polysorbate 80 (aka TWEEN 80) or other polyoxyethylene glycol sorbitan alkyl esters and sorbitan alkyl esters (e.g., Spans); MEGA 10 (N-decanoyl-N-methylglucamine); and glucoside alkyl ethers, specialty surfactant products such as the Aqueous Film-Forming Foam Concentrates (AFFF) used by firefighters to combat chemical fires combine fluoro- and hydrocarbon-surfactants in a proprietary manner and may be appropriate to use in this method. More preferable surfactants are sodium dodecyl sulfate and ammonium dodecyl sulfate. As used in the method, the concentration of the surfactants is preferentially in a range that stays below the critical micelle concentration under solution conditions to avoid formation of suds, emulsions, or precipitates or from about $10^{-6}$ M to about $5 \times 10^{-2}$ M. More preferentially, the range is from about $1 \times 10^{-5}$ M to about $5 \times 10^{-2}$ M. Most preferentially, the range is from about $0.5 \times 10^{-4}$ M to $5 \times 10^{-3}$ M.

Other additives may be advantageous for addition to the carrier solution. Additives such as foaming and gelling agents may be added. When in the carrier solution, they may limit the spread of the carrier solution after application onto the surface bearing a radionuclide contaminant. Water soluble dyes may be added to the carrier solution as a visual indicator to track the spread of the carrier solution after application onto the contaminated surface.

Brine:

In one embodiment, a brine is used to form the carrier solution. A brine is a more concentrated solution of water, the cation, and any additives of a respective carrier solution. To ultimately form the carrier solution for use in the method, the brine is mixed with water from a bulk source to dilute the brine to reach the desired carrier solution concentration. The carrier solution is then available to be applied to the contaminated surface.

Formation of the carrier solution through the brine embodiment may be advantageous in that it is possible to form the brine in smaller tanks where time, space, or distance is a concern. The brine may then be mixed with the bulk water supply in the immediate mitigation area through means such as an eductor system commonly available to fire departments. These eductors draw a secondary fluid into the main water line without the need for specialized pumps. Additionally, eductors commonly have metering valves making it possible to regulate the percentage of brine taken up as the secondary fluid into the main water line.

In one illustration, emergency response workers can quickly prepare a 15 gallon saturated brine of KCl (342 g/L at 20° C.) in a vessel. An inline eductor connected to a fire hose and with the secondary takeup tube in the brine vessel is set to draw a 6% mixture of brine/water at a 250 gallon/minute flow rate delivered through the nozzle. The worker then engages the eductor, applying the resulting approximate 0.25 M carrier solution onto a contaminated surface. In this manner, the emergency workers can apply 250 gallons of carrier solution onto a surface in one minute, without the need for extra equipment since solution tanks and eductors are often already available locally.

Applying a Carrier Solution

Applying:

The method involves a step of applying a carrier solution to a surface bearing a radionuclide contaminant. During applying, the carrier solution is put into physical contact with the contaminated surface, such that the radionuclide contaminant is mobilized by entering into the carrier solution, to form a laden solution comprising the carrier solution and the radionuclide contaminant. With respect to Cs-137 and Sr-90, the radionuclide contaminants could be mobilized through dissolution into the carrier solution.

Application of the carrier solution can be accomplished through such exemplary actions as spraying the carrier solution onto the contaminated surface, dumping the carrier solution from a bucket or sprayer as used in forest fires, and flowing the carrier solution across a horizontal surface such as a parking lot, and applicators capable for performing these actions (hoses, sprayers, fluid dumps, etc.). Further, relatively small scale items such as tools may be immersed in a carrier solution tank. It is advantageous that the application be through a means not so forceful as to mobilize the radionuclide contaminant back into the atmosphere or otherwise away from the carrier solution, but instead promote the radionuclide contaminant to enter solution, forming the laden solution. Further, it may be advantageous to perform application in a manner that prolongs exposure of the radionuclide contaminant bearing on the surface to the carrier solution, to encourage complete entry into solution where the percent of entry increases with time (FIG. 6).

Laden Solution:

Once radionuclide contaminant has been mobilized from the contaminated surface into the carrier solution, a laden solution is formed. The laden solution comprises at least a portion of the radionuclide contaminant and the carrier solution.

Contacting with a Sequestering Agent

Sequestering Agents:

Sequestering agents are solids capable of binding to a radionuclide contaminant or form precipitates when combined with the radionuclide or after adjustment of the solution conditions (e.g., pH, temperature, ionic strength). Binding may be chemical, physical, or both. The sequestering agent may be in the form of particulate solids, membranes, or a combination of both.

It is recognized by those skilled in the art to improve the efficiency of separations by employing successive batch separations at lower slurry concentration (e.g., at 40 mg/mL or less) to reduce the amount of total sequestration material and to remove exhausted sequestration material in one batch unit at a time. An alternative method is to employ a bed of material where the radioactive laden solution permeates up or down the bed before being transferred to another bed unit.

Possible sequestering agents include clays such as montmorillonite (a primary constituent of bentonite and Fuller's earth), vermiculite, illite, Halloysite, sepiolite, kaolinite, and palygorskite (a primary constituent of Fuller's Earth); natural (e.g., chabazite) and synthetic (e.g., crystalline silicotitanate and its derivatives) zeolite; soils, rocks; industry byproducts such as coal and municipal waste fly ash, building and roadway demolition materials; activated carbon or other natural and synthetic organic and inorganic ion exchange materials. Sequestering agents that form precipitates include the cyanoferrates (e.g., Prussian blue) for cesium and carbonate rich minerals such as limestone and hydrotalcite. Membranes include reverse osmosis. Combination sequestering agents include the resin wafer electrodialysis.

Preferred sequestering agents include clays. Clays are stable over time and are available in large quantities throughout the world. Clay minerals are hydrous aluminum silicates arranged in the form of layered sheets (phyllosilicates) with variable amounts of cations such as iron, magnesium, alkali metals, alkaline earths. There are several groups of clays: kaolinite, montmorillonite-smectite, illite, and chlorites, although chlorites are often categorized as a separate type of phyllosilicate material. Clay minerals are further classified as 1:1 or 2:1 to describe the types of tetrahedral silicate sheets and octahedral hydroxide sheets they are composed. A 1:1 clay would consist of one tetrahedral sheet and one octahedral sheet like those of the kaolinite clays. A 2:1 clay consists of an octahedral sheet between two tetrahedral sheets as in the vermiculites and montmorillonites. Depending on the composition of the tetrahedral and octahedral sheets, the layer will have either a neutral charge or a net negative charge. A net negative charge is caused by replacement of higher oxidation state cations with lower oxidation states during clay formation. The excess charge is balanced by the sorption of interlayer cations, commonly the alkali metals and alkali earth metals. The interlayers will also contain water that leads to the common property of swelling in clays.

Clays have advantageous characteristics as sequestering agents in that they have high swelling ability, low hydraulic conductivity, and high cationic sorption capacity. Additionally, clays are ideal as sequestering agents because cations with low hydration energy, for example radionuclide cesium contaminants, undergo dehydration in the interlayer of the clays and promote layer collapse, thus radionuclide contaminants become mechanically fixed within the clay's interlayers.

Figure 7:
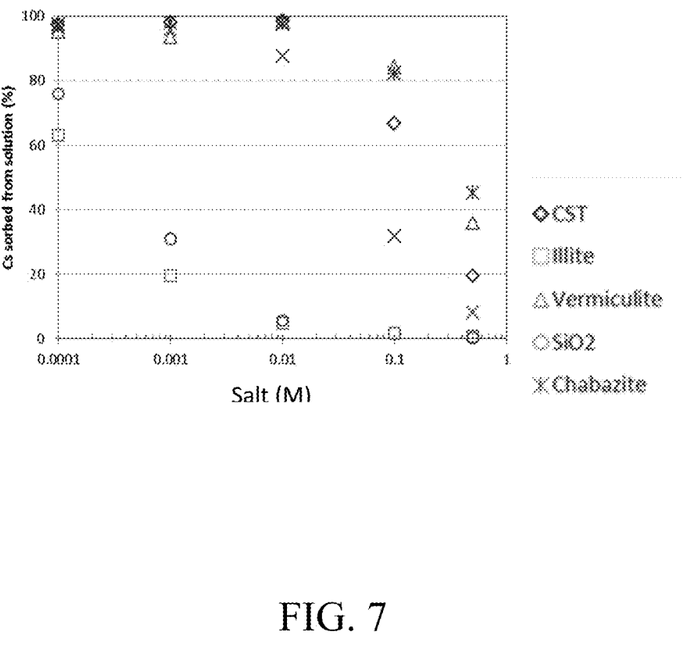
FIG. 7 illustrates the percent absorption of radionuclide contaminants by multiple clays.

Preferential clays exhibit high sorption of likely radionuclide contaminants, with performance as illustrated in FIG. 7. Preferential clays are montmorillonite and vermiculite because of their availability and affinity for radioactive cations. Most preferential is vermiculite.

Contacting the Laden Solution with Sequestering Agent:

In contacting, the laden solution comprising radionuclide contaminant in the aqueous carrier solution is physically contacted with the sequestering agent, such that at least a portion of the radionuclide contaminant may bind to the sequestering agent. When at least a portion of the radionuclide contaminant from the contaminated surface binds to the sequestering agent, a laden sequestering agent is formed. Further, a laden slurry is formed comprising the laden sequestering agent and reformed carrier solution. The reformed carrier solution is defined as a solution comprising formerly laden solution where at least a portion of the radionuclide contaminant has left solution through binding to the sequestering agent. Thus, by binding the radionuclide contaminant to the sequestering agent, the radionuclide contaminant is removed from solution and the reformed carrier solution is available for repeated use. Preferably, at least 90% of the radionuclide contaminant in the laden solution binds to the sequestering agent in the solution transition from laden slurry to reformed carrier solution.

In function, the sequestering agent, through binding, removes the radionuclide contaminant from solution and enables the radionuclide contaminants easy disposal. As a result, the once mobile radionuclide contaminant sitting on a surface has been immobilized and prevented from being further spread through the area.

There are many approaches for contacting the laden solution with the sequestering agent. Where large applications of the method are being performed, or the system being utilized, as would be required for example in the mitigation of heavy equipment or building infrastructure, the sequestering agent may be spread across the ground downgrade from the application area. This may be performed by dumping the sequestering agent from a vehicle such as a truck and spreading the sequestering agent using shovels. The intent is to have the solutions run down from the infrastructure to come in immediate contact with the sequestering agent so that the radionuclide contaminants are quickly bound and immobilized. Any solution coming into contact with the sequestering agent would be stripped of at least a portion of the radionuclide contaminant by the sequestering agent, forming the laden sequestering agent and generating a laden slurry.

In another approach to contacting laden solution with sequestering agent, the sequestering agent may be premixed into the carrier solution. When premixed, the resulting viscous slurry/mud-type mix may be ideal for flowing across highly graded or pitched surfaces, to both increase the duration the carrier solution is in contact with the contaminated surface as well as increase controllability of the fluids during mitigation operations.

In yet another approach, the sequestering agents may be used to fill a container, where a portion of the container is made of a material permeable to the carrier solution, and in turn the reformed carrier solution. Further, the containers may also be permeable to the laden solution, and in turn the reformed carrier solution. In an exemplary use of such a container, the containers may be used to form a system of berms to create reservoirs. The containers would be able to substantially contain laden solution, while any laden solution leaching through the barrier would be stripped of at least a portion of the radionuclide contaminant, essentially forming reformed carrier solution.

This approach may be exemplary performed by formation of a reservoir made by filling collapsible construction containers or gabions commonly stockpiled for construction, military, and flood applications. Gabions are preferentially filled with the sequestering agent; however, availability may necessitate at least partial fill such as rocks, dirt, or sand. After formation of the reservoir, the carrier solution is applied to the contaminated surface and the resulting laden solution is contained within the reservoir. As time and materials allow, additional sequestering agent may be added to the reservoir to bind radionuclide contaminants. Additionally, containers of sequestering agent may be placed atop catch basins, sewer caps, and utility manhole covers to prevent extensive intrusion of contaminated waters into the underground tunnels.

In the above reservoir approach, containment of the laden solution within the reservoir vessel also allows additional sequestering agent to be mixed with the laden solution either inside or outside of the reservoir. When mixing occurs within the reservoir, the resulting laden slurry can then be pumped from the reservoir or allowed to air dry in a controlled manner as the radionuclide contaminants are bound to the sequestering agents. The dried laden sequestering agent could be disposed of as time, facilities, and personnel allow. If the laden solution is to be removed from the reservoir prior to mixing, the mixing operation may occur as part of the removal step (mixing while pumping) or later.

When contacting the sequestering agents with the laden solution, it is preferable to limit the volume of laden solution coming into contact with the sequestering agents. As the sequestering agents become increasingly loaded with contaminant, the ability to absorb radionuclide contaminants is diminished. Exemplary means to monitor the volume of laden solution coming into contact with the sorbent solution include employing holding tanks or storage reservoirs and mixing or metering the laden solution sequentially through the sequestering agent or to permit the laden solution to penetrate a bed of sequestering agent and then transferring the solution to another bed for further treatment.

It may be preferred to limit the volume of laden solution contacting to a ratio of 1 mL/0.01 g or 1 L/0.01 kg or 100 L/kg in successive batch reactions. A more preferable range is to no more than 10 L/kg.

Separating

Retaining

In order to perform certain operations, a retaining step is required to retain the mobilized radionuclide contaminant after it has left its respective surface. Retaining means physically-confining or keeping control of the associated material, be it laden solution, laden sequestering agent, regenerated carrier solution, etc. As noted above, retaining can be accomplished by forming a system of berms to create a reservoir. In another example, retaining is accomplished through performing the method or confining the system to a sealed container or containers such as a series of washbasins.

Separating

In another embodiment, a separating step is performed. In separating, after contacting the laden solution to the sequestering agent such that at least a portion of the radionuclide contaminant binds to the sequestering agent to form the laden sequestering agent, a separating operation is performed to separate the regenerated carrier solution from the laden sequestering agent. In effect, separating substantially divides the laden sequestering agent from the fluids. In instances where there is sufficient time, separating may be performed by allowing the sequestering agent to settle to the bottom of the vessel. In that process, the regenerated carrier solution may be skimmed from the top to be recycled or disposed in another manner.

Preferentially, separating is accomplished by carrying out filtration. Filtration is commonly known as a mechanical or physical operation to separate solids from liquids. In one variation of filtration, a centrifugal filter is utilized. Centrifugal filters have no moving parts excluding the pump that feeds the separator. Centrifugal action forces solid material into a purge zone, separating solid materials from clarified fluid product. Centrifugal filtration units capable of operating at very high throughput (millions of gallons per day) on high slurry concentrations are commercially available, easily sourced, and are modularized for movement and operation on vehicles. Filtration may also be performed by mechanical filtration as with simple bag filters.

Recycling

Additionally, separation operations may be conducted in series. For example, the clarified fluid from a centrifugal filter or series of centrifugal filters may be separately fed to another unit such as a bag filter for secondary or final clarification. As a result of the described separation operation, a substantial portion of the laden sequestering agent is retained by the filters while the clarified solution, which is substantially regenerated carrier solution with only relatively small residual amount of radionuclide contaminant, is separated.

After separating, recycling operations may be performed. In recycling, the carrier solutions regenerated during a separating step are used during a subsequent application step. By performing recycling, the total volume of contaminated fluids is reduced. The reduction of fluid used for solution and generated during practicing the method relieves the stress on the water supply and reduces the total amount of fluid waste requiring disposal.

In an exemplary combination of the above embodiments, a carrier solution comprising water and a cation is formed using a brine. The brine is combined with bulk water through an eductor, which also serves for applying the resulting carrier solution to a surface contaminated with radionuclide contaminants. The laden solution formed as the radionuclide contaminants enter the carrier solution is directed into a reservoir formed from gabions filled with sequestering agents. When time allows, the pool of laden carrier solution is pumped from the reservoir and mixed with additional sequestering agents, contacting the laden solution with sequestering agents forming the laden slurry comprising laden sequestering agents and regenerated carrier solution. The laden slurry is then separated first by centrifugal filtration to remove the bulk of the laden sequestering agents. The filtrate is then filtered again, this time through a bag or membrane filter, to remove the remainder of the sequestering agents including the laden sequestering agents. The solids are then disposed. The regenerated carrier solution resulting from the separation process is then recycled back to mitigation area for a repeated application to the contaminated surface.

The removal and sequestration of the radionuclide contaminant from the contaminated surface leads directly to a reduction in the amount of radiologically-impacted equipment, critical infrastructure, and the environment. The method is able to be performed economically with materials quickly available in the event of a radiological dispersion event.

System

The disclosure further contemplates a system for the mitigation of a system to provide the mitigation of a radionuclide contaminant from a surface. The system comprises at least an aqueous carrier solution comprising a cation, and a sequestering agent. The system may further comprise individually or in combination: at least one permeable container for retaining sequestering agent; a separator, such as a centrifugal filter or membrane filter; an applicator, such as a sprayer, fire house, or eductor system.

Having described the basic concept of the invention, it will be apparent to those skilled in the art that the foregoing detailed disclosure is intended to be presented by way of example only, and is not limiting. Various alterations, improvements, and modifications are intended to be suggested and are within the scope and spirit of the present invention. Additionally, the recited order of the elements or sequences, or the use of numbers, letters or other designations therefore, is not intended to limit the claimed processes to any order except as may be specified in the claims. All ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like refer to ranges which can be subsequently broken down into sub-ranges as discussed above. Accordingly, the invention is limited only by the following claims and equivalents thereto.

All publications and patent documents cited in this application are incorporated by reference in their entirety for all purposes to the same extent as if each individual publication or patent document were so individually denoted.

We claim:

1. A method of radionuclide contaminant mitigation, which comprises
    applying a carrier solution to a surface bearing a radionuclide contaminant, where the radionuclide contaminant is selected from the group consisting of $^{60}$Co, $^{137}$Cs, $^{192}$Ir, $^{90}$Sr and $^{241}$Am,
where the carrier solution an anionic surfactant comprises water and a cation,
where the cation is selected from the group consisting of K$^+$, Na+, Mg$^+$, Li$^+$, NH$_4^+$, Ba$^{2+}$, Ca$^{2+}$, and Mg$^{2+}$, and
where the cation is in a concentration range from about 0.01 M to about 1.0 M, causing at least a portion of the radionuclide contaminant to enter the carrier solution to form a laden carrier solution comprising the radionuclide contaminant and carrier solution; and
    contacting the laden solution with a sequestering agent, where the sequestering agent is a clay,
where at least a portion of the radionuclide contaminant of the laden solution binds to at least a portion of the sequestering agent to form a laden sequestering agent and to generate a laden slurry comprising the laden sequestering agent and reformed carrier solution.

2. The method of claim 1 where the sequestering agent comprises a clay selected from the group consisting of montmorillonite, vermiculite, zeolite, illite, kaolinite, and bentonite.

3. The method of claim 1 where the surfactant is in a concentration range from about $10^{-6}$ M to about $5 \times 10^{-2}$ M.

4. The method of claim 3 where the surfactant is sodium dodecyl sulfate or ammonium dodecyl sulfate.

5. The method of claim 1 further comprising separating the laden slurry to remove at least a portion of the laden sequestering agent from the reformed carrier solution.

6. The method of claim 5 further comprising separating by centrifugal filtration.

7. The method of claim 5 further comprising recycling the reformed carrier solution.

8. A method of radionuclide contaminant mitigation, which comprises
    forming a brine comprising water and a cation,
where the cation is selected from the group consisting of K$^+$, Mg$^+$, Na$^+$, and NH$_4^+$,
    mixing a carrier solution an anionic surfactant comprising water and the brine,
where the cation in the carrier solution is in a concentration in the range from about 0.01 M to about 1.0 M;
    applying the carrier solution to a surface bearing a radionuclide contaminant,
where the radionuclide contaminant is selected from the group consisting of $^{60}$Co, $^{137}$Cs, $^{192}$Ir, $^{90}$Sr and $^{241}$Am,
causing at least a portion of the radionuclide contaminant to enter the carrier solution to form laden carrier solution comprising the radionuclide contaminant and carrier solution; and
    contacting the laden solution with a sequestering agent, where the sequestering agent is a clay,
where at least a portion of the radionuclide contaminant of the laden solution binds to at least a portion of the sequestering agent to form a laden sequestering agent and to generate a laden slurry comprising the laden sequestering agent and reformed carrier solution.

9. The method of claim 8 where the sequestering agent comprises a clay selected from the group consisting of montmorillonite, vermiculite, zeolite, illite, kaolinite, and bentonite.

10. The method of claim 8 where the surfactant is in the concentration range from about $10^{-6}$ M to about $5 \times 10^{-2}$ M.

11. The method of claim 8 where the surfactant is sodium dodecyl sulfate or ammonium dodecyl sulfate.

12. The method of claim 8 further comprising separating the laden slurry to remove at least a portion of the laden sequestering agent from the reformed carrier solution.

13. The method of claim 12 further comprising separating by centrifugal filtration.

14. The method of claim 12 further comprising recycling the laden slurry to remove at least a portion of the laden sequestering agent from the carrier solution.

* * * * *